Patented May 30, 1944

2,349,818

UNITED STATES PATENT OFFICE 2,349,818

BY-PRODUCT FEED

Walter R. Fetzer, Clayton, Mo., assignor to Union Starch & Refining Company, Columbus, Ind., a corporation of Indiana No Drawing. Application January 13, 1942,
Serial No. 426,553

8 Claims. (Cl. 99—9)

My invention relates to the process of manufacturing gluten feed in the wet milling industry, wherein a feed of relatively high nutritional characteristics and of better keeping qualities is obtained, and at the same time, securing from this process alcohol as a by-product.

In the manufacture of starch in the wet milling industry, the raw material is corn and the finished product starch. To obtain the starch, it is necessary to remove from the berry, the contained solubles, germ, hull and gluten. This is accomplished by a sequence of screening and washing operations of the corn wherein each of these components is removed. The process as the name implies is carried out by wet processing, the fresher water washing the extracted starch and moving counter-currently to the flow of the comminuted corn, wherein it successively picks up solubles until it meets the incoming whole berry.

At this stage, it is acidulated with sulphur dioxide ($SO_2$) in amounts ranging from .2 to .3% after which it is used to soak or soften the berry, and at the same time remove a substantial amount of the solubles from the corn berry. This period of soaking or softening at a temperature of approximately 125° F. requires 36 to 48 hours.

This water, now rich in corn solubles and running 3½ to 5° Baumé (100° F.) and known in the art as steep water, is withdrawn for evaporation in vacuum to concentrations of from 20 to 30° Baumé. At this stage, it is held for blending with other solid components removed during the processing of the corn berry, to form by-product feeds for cattle, etc.

The softened corn berry, now containing about 42% moisture, is passed to an attrition mill which breaks the berry, freeing the germ which is removed by flotation. In so doing, a considerable quantity of starch is freed, together with gluten, which are removed by reeling. The reel discharge containing hull and corn grits passes to a Buhr mill which finally grinds the mass. The effluent is then passed to a series of coarse reels which remove the coarse hull.

This hull is dried and used for a blending component in preparation of the feeds. The material passing through the reels, consisting of fine fiber, gluten and starch is passed through a finer set of reels, including silk reels, which effect the separation of fine fiber. The fine fibre is removed and later also utilized as a blending component for feeds. The stream through the fine reels is made up of starch and gluten and this, in combination with the similar stream removed earlier, is passed to tables, whereon a separation of gluten and starch is effected, the starch settling and the gluten floating off. The gluten is collected in settlers, wherein a concentration is effected by settling, the heavy slurry of gluten being then used as a further blending component in the manufacture of the feeds.

The solubles in the corn berry consist of protein, sugars, gums, and ash or mineral matter. The amount of solubles in the corn berry varies, depending upon the locality in which it is grown, climatic conditions during the growing season and the maturity of the berry at the time of harvesting. The protein content varies from 7 to 12% and the sugar content from 2½ to 5%. The natural soluble content of the berry is augmented during the steeping operation through hydrolysis, by the acid, of the insoluble as well as the soluble protein. The hydrolyzing action of the protein is characterized by the formation of amino acids or small protein units. The composition of this steep water varies considerably but may be expressed by the following general analysis:

| | Per cent |
|---|---|
| Crude protein | 43 |
| Ash | 16 |
| Carbohydrates (sugars and gums by difference) | 41 |

The crude protein is largely soluble and contains substantial quantities of amino acids. Of the carbohydrates, upwards to 25% is usually assumed to be fermentable sugars. The amount of dry substance in the steep water from a bushel of corn varies with the individual company, but the range of 3 to 6 pounds per bushel will cover most wet milling operators.

As set forth above, the by-product feeds, corn gluten meal and corn gluten feed are made by processing the various end products obtained in the wet milling operation.

Corn gluten meal is a blend of gluten and fine fiber.

Corn gluten feed is a blend of coarse hulls, steep water and sufficient gluten to bring the feed up to its minimum guaranteed crude protein content. Corn gluten feed has offered considerable difficulties from the standpoint of storage and from the standpoint of consumer acceptance because of the formation of color therein which turns the product, normally of light yellow to a light brown, walnut or coffee color. The difficulties with such feeds in storage involve not only the formation of color but also the formation of heat, which not only accelerates the reaction but often results in spontaneous combustion.

I have found that the formation of the color is caused by a reaction between the amino acids or other small protein units and the reducing sugars present. This reaction produces caramel color and the reaction is exothermic.

I therefore, according to this invention, remove the sugars and thus reduce substantially the formation of color and heat therefrom.

It is the object of my invention to produce a feedstuff which will not substantially discolor or react to produce exothermic heat.

It is a further object of my invention to produce a feedstuff substantially free of sugar, so that such sugar is no longer available for the reaction with amino acids, thus eliminating the possibility of heat formation and substantially eliminating subsequent color formation.

It is a further object of my invention to convert and remove the sugar present in the form of alcohol which will offset the dry substance loss.

It is a further object of my invention to produce a by-product feed containing residual yeast, which places the feedstuff in a higher trade classification from the standpoint of sale.

It is a further object of this invention to produce a feedstuff of relatively higher protein content through diminution of its sugar content, which results in a higher sales classification of the feedstuff.

All of these objects I accomplish by fermentation of the steep water after concentration and by using the spent steep water from the fermentation as the blending agent.

Specifically, the steep water is concentrated to 15 to 20° Baumé or heavier steep water may be diluted to this Baumé. The resultant (20° Bé.) mash mixture is cooled to 85° F. The pH is usually adjusted, with acid or alkali according to its original pH, to a pH of 4.8 to 5.0 and then inoculated with yeast at the rate of 1½ to 2 grams per liter. Fermentation proceeds at an accelerated rate until substantially all of the sugar contained in the steep water has been converted to alcohol, the fermentation taking about 24-40 hours. A temperature of about 85° to 90° is maintained for this fermentation.

The yeast increases in content from ten to twenty-five fold of the original yeast because of the nutrient nature of the mix.

The alcohol is distilled off from the fermented steep water. The following examples show the amounts of alcohol formed with steep waters of different initial concentrations.

| Initial steep water | Concentration of alcohol produced | Dry substance of steep water necessary to make 1 gallon of 95% alcohol |
|---|---|---|
| EXAMPLE 1 | | |
| 21.6 Baumé | 3.06 | Pounds 127 |
| EXAMPLE 2 | | |
| 17.8 Baumé | 3.13 | 99 |
| EXAMPLE 3 | | |
| 17.5 Baumé | 2.60 | 117 |

The alcohol produced by this process can then be calculated as one gallon of alcohol produced for each 25 bushels of corn.

This alcohol by-product production is economically advantageous in that the sugar (contained in the feed product) is ordinarily sold as part of the feed which has a price of approximately 1¢ a lb., whereas in the form of alcohol, the same sugar commands a price of 2 to 4 times that amount. The cost of the conversion of the sugar in the steep water to alcohol, as set forth in the present invention, is relatively low.

The effluent or steep water remaining after the alcohol is distilled off is then concentrated in vacuum pans to about from 25° to 40° Baumé and combined with fine and coarse bran and gluten to form the feed. The fine and coarse bran and the gluten have been removed from the corn during the isolation of the starch therein.

The initial yeast which was added to inoculate the steep water, having multiplied many-fold because of the nutrient nature of the steep water, becomes a substantial ingredient of the effluent from the beer still used to recover the alcohol.

Whereas substantially all of the sugar has been removed from the steep water and since the coarse bran and fine slop in themselves contain primarily starch and the resettled gluten contains primarily protein and a minor proportion of starch with substantially no sugar, the entire combination has a relatively low sugar content and high protein content. Since the feed combination has a low sugar content I avoid the objectionable characteristic recited above in the ordinary feeds of commerce; namely, color change and exothermic heat reaction during storage.

The feeds formed according to my invention are substantially sugar free containing, by weight, less than 1% of sugar; rich in protein, containing at least 25% protein; and a substantial proportion of yeast.

Various modifications of my invention will suggest themselves to those skilled in the art. I accordingly desire that in construing the breadth of the appended claims that they shall not be limited to the specific details shown and described in connection with the exemplifications thereof.

I claim:

1. A gluten feed comprising bran, gluten and fermented steep water, said feed being substantially free of yeast fermentable sugars.

2. A gluten feed comprising bran, gluten and fermented steep water, said feed containing less than 1% of fermentable sugars.

3. A gluten feed comprising bran, gluten and fermented steep water, said feed being substantially free of fermentable sugars and containing a substantial proportion of the yeast used in producing the fermented steep water.

4. A gluten feed comprising bran, gluten and fermented steep water, said feed being substantially free of fermentable sugars and containing at least 25% protein and a substantial proportion of the yeast used in producing the fermentation.

5. A gluten feed comprising bran, gluten and fermented steep water, said feed containing at least 25% of protein and less than 1% of fermentable sugars.

6. A gluten feed comprising bran, gluten and fermented steep water, said feed containing at least 25% protein, less than 1% of fermentable sugars, and a substantial proportion of yeast used in producing the fermentation.

7. In the wet milling of corn, a process of producing a substantially non-discoloring and non-heating feed, the steps of concentrating the steep water produced, inoculating and fermenting the steep water by microorganisms, so as to render the steep water substantially sugar free, adding the same to mill end products of bran fiber and gluten so as to produce a finished feed containing the microorganisms producing the fermentation.

8. In the process of wet milling corn for the production of starch, the steps of steeping corn in water for the removal of the soluble solids contained in the corn; concentrating the so produced steep water to a suitable concentration for fermentation; inoculating the concentrated steep water with a micro-organism adapted to convert sugar to alcohol and maintaining the concentrated steep water at a temperature suitable for fermentation; fermenting the inoculated steep water to convert the sugar contained therein to alcohol; distilling the fermented steep water to remove the alcohol; concentrating the effluent to a suitable concentration and combining the concentrated sugar free steep water with fine and coarse bran and gluten to form a suitable feed.

WALTER R. FETZER.